April 20, 1948. T. W. PETKOFF 2,440,116
DRIVING ATTACHMENT FOR MOTORCYCLES
Filed March 17, 1945 2 Sheets-Sheet 1

Inventor
Theodore W. Petkoff
By L. B. James
Attorney

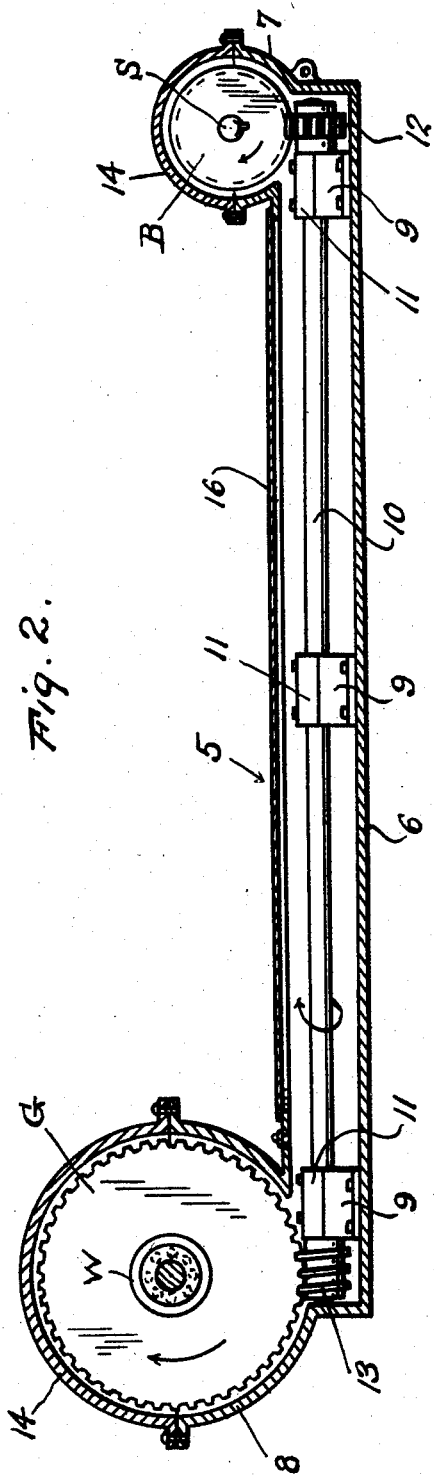
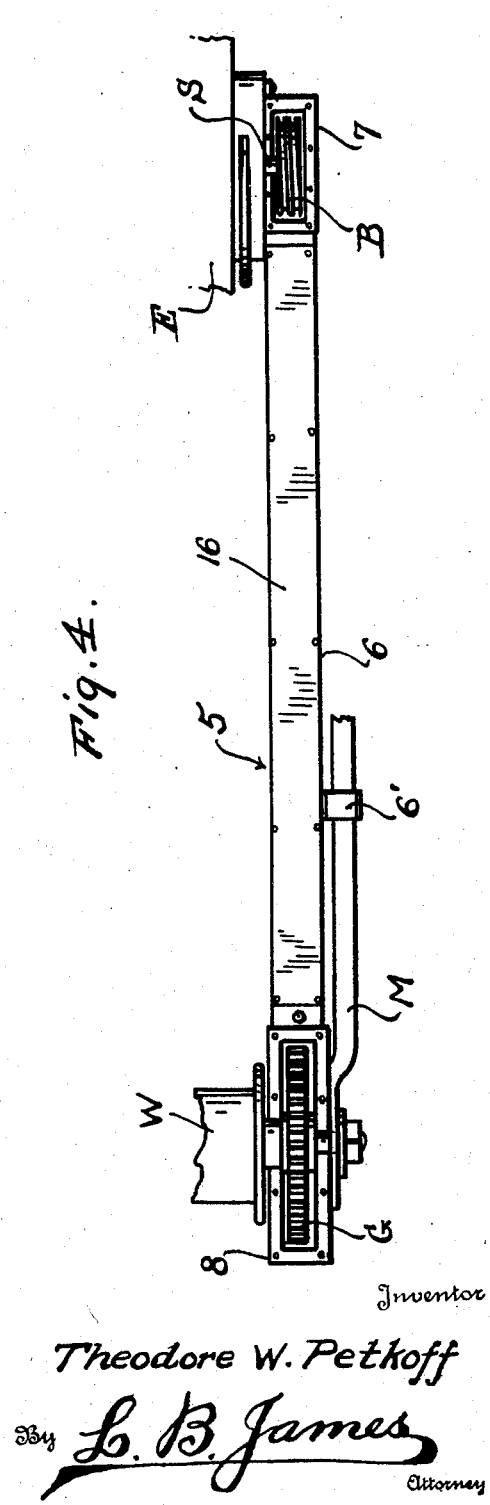

Patented Apr. 20, 1948

2,440,116

UNITED STATES PATENT OFFICE 2,440,116

DRIVING ATTACHMENT FOR MOTORCYCLES

Theodore W. Petkoff, Evansville, Ind.

Application March 17, 1945, Serial No. 583,353

1 Claim. (Cl. 180—30)

This invention relates to motorcycles and more particularly an attachment connecting the engine thereof to the drive wheel of the same.

The primary object of this invention resides in the provision of means whereby the engines of motorcycles are connected to the drive wheels thereof by a shaft.

Another object of this invention resides in the provision of a driving unit to be substituted for the conventional drive chains and belts of motorcycles and operable in a lubricant.

A further object of this invention resides in the provision of a power transmitting unit for motorcycles adapted to be attached thereto for connecting the engine thereof to the drive wheel of the same.

A still further object of this invention resides in the particular construction of the power transmitting attachment.

With these and other objects in view this invention resides in certain novel features of construction and arrangement of elements to be hereinafter more fully set forth in the specification, illustrated in the accompanying drawings and pointed out in the appended claim and, while this disclosure depicts my present conception of the invention, the right is reserved to resort to such changes in construction and arrangement of elements as come within the spirit of the invention.

In the accompanying drawings forming a part of this invention;

Fig. 2 is an enlarged vertical longitudinal sectional view through the power transmitting unit.

Fig. 4 is a horizontal sectional view taken approximately on line 4—4 of Fig. 1 showing the power transmitting unit connected between the engine and drive wheel of the motorcycle.

Figure 1:
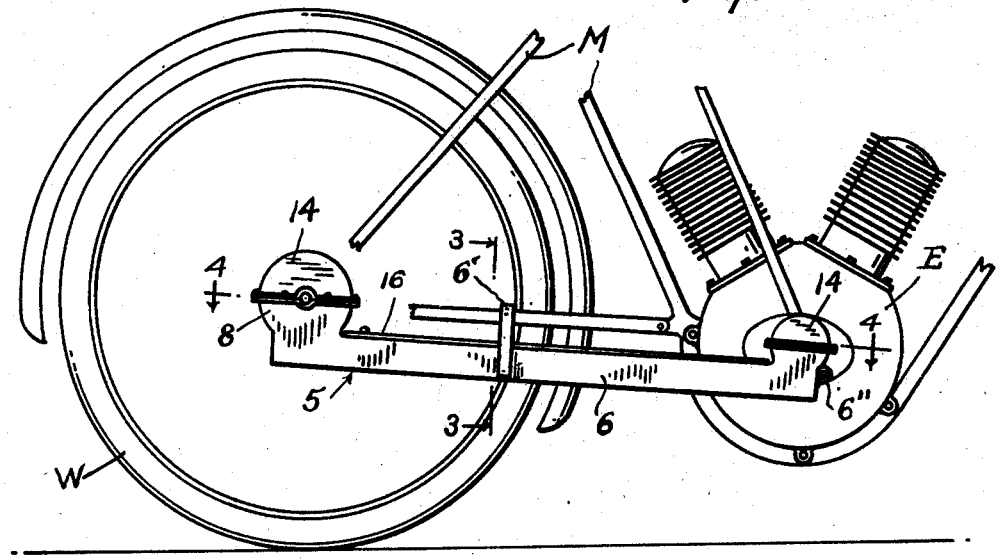
Fig. 1 is a side view of a portion of a motorcycle showing the power transmitting unit attached thereto.
Figure 3:
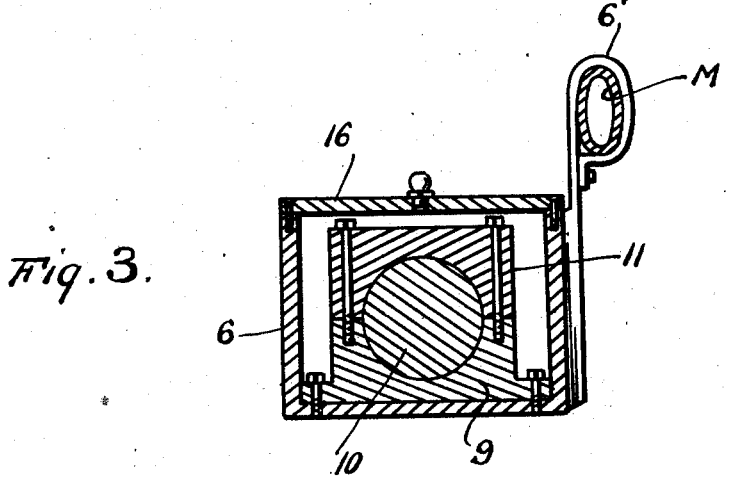
Fig. 3 is a cross sectional view through the power transmitting unit taken approximately on line 3—3 of Fig. 1.

In the present illustration of this invention, the letter M designates, in general, a portion of a motorcycle which, among other well known elements, consists of an engine E having a drive shaft S and a drive wheel W having a suitable gear G secured thereto to which and a gear B secured to the drive shaft of the engine is connected the power transmitting unit forming this invention and designated, in general by the numeral 5.

The power transmitting unit 5 consists of an elongated casing 6 having substantially semi-circular upstanding compartments 7 and 8 at its opposite ends to partially surround and enclose the aforesaid gears G and B and removably secured to the bottom wall thereof are spaced bearing blocks 9 in which is journalled a longitudinally extended shaft 10 retained in the bearings by removable caps 11.

Secured or keyed on the opposite ends of the aforesaid shaft are suitable gears 12 and 13, the former of which meshes with the gear B while the latter of which meshes with the gear G to transmit power from the engine drive shaft to the drive wheel of the motorcycle.

The enlarged portions 7 and 8 of the casing are provided with substantially semi-circular caps 14 adapted to fit over the same and cover the aforesaid gears B and G and thereby permit the unit to be readily assembled on the motorcycle.

Removably secured to the casing is a coverplate 16 to permit assemblage of the aforesaid shaft 10 and gears thereon in the casing and also pack the casing with a suitable lubricant, however, it is within the purview of this invention to provide the casing with any well known means whereby lubricant can be injected into the same for continuous use without leaking therefrom.

What I claim and desire to protect by Letters Patent is:

In a power transmitting unit for motorcycles comprising an elongated casing having an elongated opening in its upper side and upstanding substantially semi-circular compartments formed on its opposite ends to receive gears on the engine drive shaft and driving wheel of the motorcycle, aligned bearing blocks removably secured to the bottom of the casing, a shaft seated on the bearing blocks, caps removably secured to the bearing blocks and retaining the shaft thereon, gears secured to the opposite ends of the shaft and meshing with the engine and drive wheel gears, substantially semi-circular caps removably secured to the semi-circular compartments of the casing and covering the aforesaid gears, an elongated cover plate secured over the opening in the casing and brackets detachably securing the casing to the frame of the motorcycle.

THEODORE W. PETKOFF.

REFERENCES CITED

The following references are of record in the file of this patent:

UNITED STATES PATENTS

| Number | Name | Date |
|---|---|---|
| 1,802,050 | Duresen | Apr. 21, 1931 |
| 2,156,412 | Tingle | May 2, 1939 |
| 2,077,628 | Jordan | Apr. 20, 1937 |

FOREIGN PATENTS

| Number | Country | Date |
|---|---|---|
| 427,510 | Germany | Apr. 7, 1926 |